March 2, 1948.　　　J. R. FISHER, JR　　　2,436,993
APPARATUS FOR INJECTION MOLDING
Filed Aug. 4, 1945
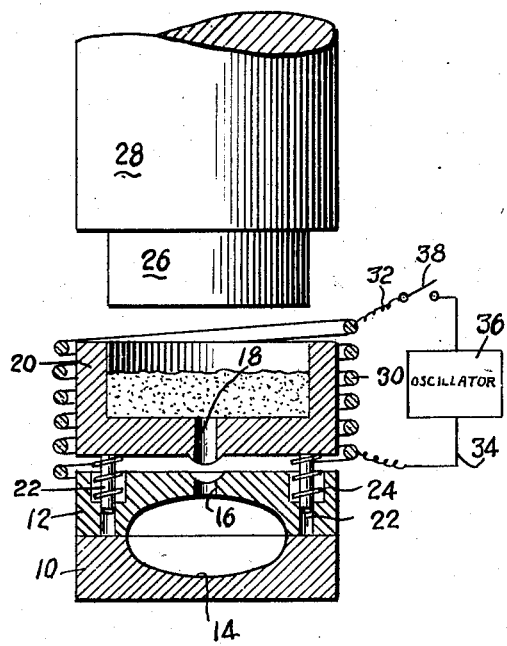
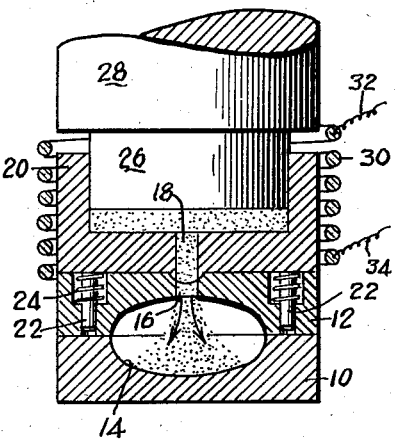
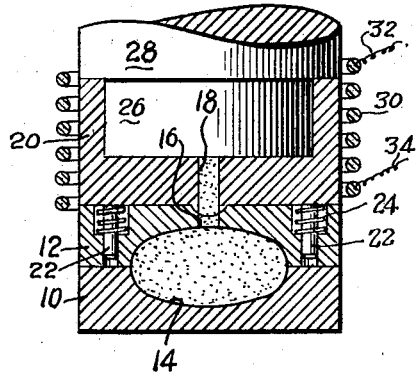
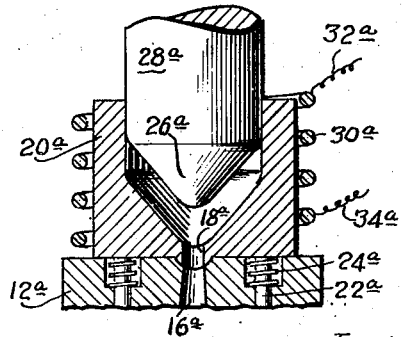
Inventor
John R. Fisher, Jr.,
BY
Toulmin & Toulmin
ATTORNEYS Patented Mar. 2, 1948

2,436,993

UNITED STATES PATENT OFFICE 2,436,993

APPARATUS FOR INJECTION MOLDING

John R. Fisher, Jr., Dayton, Ohio, assignor to H-P-M Development Corporation, Wilmington, Del., a corporation of Delaware Application August 4, 1945, Serial No. 608,904

4 Claims. (Cl. 18—30)

This invention relates to apparatus for molding materials such as plastics or plastics having granulated metals dispersed therein.

The particular object of this invention is to provide an apparatus for molding which will substantially decrease the time required for cycle of operations.

It is also an object to provide an apparatus for molding relatively large objects which heretofore have required a long work cycle in order to form.

It is another object to provide an apparatus for molding which is conserving of heat, utilizing only so much heat as is required to raise the required amount of material to molding temperature.

This invention is particularly directed, but is not intended to be limited to, the molding of large objects which are pressed in heated dies. In this method of molding the heat is customarily conducted to the molding material through the dies from heated platens. In the case of large workpieces this requires a very long cycle amounting, in some cases, to more than an hour.

Not only does this long work cycle tie up dies, machinery and labor for a long period of time, but there is also a tendency for the workpiece to over-cure on the outside portion thereof. Thus, inferior workpieces often result when the object is large and they are formed according to methods commonly practiced.

This invention proposes the use of high frequency electric currents to generate heat in order to facilitate the molding of large objects and also to decrease the time of the work cycle necessary.

This invention will be more fully understood upon reference to the following description taken in connection with the attached drawings, in which:

Figure 1 illustrates the apparatus according to this invention with a charge of material inserted and ready for heating;

Figure 2 shows the device after the material has been heated and the plunger has commenced its working stroke;

Figure 3 shows the apparatus at the conclusion of the working stroke with the die cavity filled; and Figure 4 shows one form of modified pressing plunger and heating chamber.

Referring to the drawings, 10 indicates a fixed die portion and 12 indicates another die portion adapted to cooperate with the said fixed portion. The die portions 10 and 12 define a cavity 14 of relatively large capacity.

The die portion 12 has a sprue opening 16 therein which communicates with a passage 18 in the chamber 20 which is superimposed on the die portion 12. The chamber 20 is supported on rods 22 which are received in counter-bored recesses in the die portion 12. Springs 24 urge the chamber 20 away from the die portion 12 so that the sprue may be broken in order to facilitate the removal of the workpieces from the die.

The chamber 20 is adapted to receive the portion 26 of the plunger 28 which may be reciprocated by any suitable motor means such as a fluid operable ram. The portion 26 is adapted to force the molding material from the chamber 20 through the openings 18 and 16 into the cavity 14 while the shoulder between the portions 26 and 28 is adapted to engage the upper portion of the chamber 20 and to force it, together with the die portion 12, against the fixed die portion 10 so that the entire assembly is firmly maintained together until the workpiece cures.

Arranged around the chamber 20 is a coil 30 which is connected by the wires 32 and 34 to a source of alternating current at 36. A switch 38 is selectively operable to connect or disconnect the coil 30 from the oscillator 36. The oscillator is preferably adapted for generating high frequency electric oscillations on the order of from 10,000 cycles per second and higher in order efficiently to transfer energy to the chamber 20 and to the molding material.

The chamber 20 is of an electrically conductive material in order to absorb energy from the electric field and is preferably magnetic. The dies may also be electrically conductive and are thus adapted for absorbing heat from the field of the coil 30.

Operation

In the operation of this device, a predetermined amount of the material to be molded is placed within the chamber 20 as indicated in Figure 1. The switch 38 is then closed so that the coil 30 is energized and the material is raised to molding temperature by the heat conducted thereto from the chamber 20 which is heated by the alternating field of electromagnetic induction set up by the coil 30. If the molding material includes metallic particles heat is also developed therein by the aforementioned field.

After the material is sufficiently plastic to flow through the openings 16 and 18 the plunger 28 is advanced so that the portion 26 thereof commences to displace the plastic from the chamber 20 into the die cavity 14. This is indicated in Figure 2.

The transferring of the plastic from the chamber 20 into the cavity 14 continues until the die cavity 14 is completely filled, at which time the chamber 20 is preferably completely emptied. This is illustrated in Figure 3.

After the material has cured or set sufficiently to permit the removal of the workpiece the plunger 28 is retracted from the chamber 20 and the die is opened.

It will be apparent that various modifications may be made, in the structure while employing the method of this invention, one of which is illustrated in Figure 4 wherein parts similar to the parts of Figure 1 are correspondingly numbered with a subscript a. In this figure the portion 26a of the plunger has a conical end thereon and the chamber 20a is formed to the same general shape. This form of chamber and plunger facilitate the removal of excess material from the said chamber should it become hardened therein as well as promoting the flow of the material from the chamber to the die.

It will be apparent that this invention provides for an improved method of molding large objects which substantially decreases the length of time of the work cycle. Also, this method is conserving of heat inasmuch as only the needed amount of material is heated, and it is not necessary to maintain a high temperature at the surface of the die in order to cause the heat to flow therethrough into the plastic.

It will be understood that various modifications and arrangements in structure could be made without departing from the spirit of my invention and, accordingly, I desire to comprehend such modifications and substitutions of equivalents as may be considered to come within the scope of the appended claims.

I claim:

1. An apparatus for molding material which becomes plastic when heated comprising; a multi-part die having a cavity and a transverse parting plane; an electrically conductive container; means for yieldably supporting and spacing said container on said die comprising a plurality of bores in said die, springs in said bores engaging the under side of said container and pins carried by said container extending into said bores; means for heating the material to molding temperature comprising an induction coil about the container for heating the container and therethrough the material; a restricted passage in said container and a passage aligned therewith in said die for permitting the flow of material from the former to the latter; a single pressing plunger operable in one stroke to clamp the die together, to move the container against the die, to transfer the material into the die cavity, and to exert pressure on the material within the die cavity, the material pressing area of said plunger being greater than the projected area of said cavity for maintaining a clamping thrust on said die throughout a pressing cycle; and a shoulder on said plunger to engage said container and therethrough positively to hold said die clamped at the end of a working stroke of the plunger.

2. An apparatus for molding material which becomes plastic when heated comprising; a multi-part die having a cavity and a transverse parting plane; an electrically conductive container; said container and die constituting two relatively movable members, means for yieldably supporting said container on said die comprising a plurality of bores in one member, springs in said bores separating said members and pins carried by said other member extending into the bores in said one member; means for heating the material to molding temperature comprising an induction coil about the container for heating the container and therethrough the material; a restricted passage in said container and a passage aligned therewith in said die for permitting the flow of material from the former to the latter; a single pressing plunger operable in one stroke to clamp the die together, to move the container against the die, to transfer the material into the die cavity, and to exert pressure on the material within the die cavity, the material pressing area of said plunger being greater than the projected area of said cavity for maintaining a clamping thrust on said die throughout a pressing cycle; and a shoulder on said plunger to engage said container and therethrough positively to hold said die clamped at the end of a working stroke of the plunger.

3. An apparatus for molding material which becomes plastic when heated comprising; a multi-part die having a cavity and a transverse parting plane; an electrically conductive container; said container and die constituting two relatively movable members, means for yieldably supporting said container on said die comprising a plurality of bores in one member, resilient means in said bores separating said members and pins carried by said other member extending into the bores in said one member; means for heating the material to molding temperature comprising an induction coil about the container for heating the container and therethrough the material; a restricted passage in said container and a passage aligned therewith in said die for permitting the flow of material from the former to the latter; a single pressing plunger operable in one stroke to clamp the die together, to move the container against the die, to transfer the material into the die cavity, and to exert pressure on the material within the die cavity, the material pressing area of said plunger being greater than the projected area of said cavity for maintaining a clamping thrust on said die throughout a pressing cycle; and a shoulder on said plunger to engage said container and therethrough positively to hold said die clamped at the end of a working stroke of the plunger.

4. An apparatus for molding material which becomes plastic when heated comprising; a multi-part die having a cavity and a transverse parting plane; an electrically conductive container; said container and die constituting two relatively movable members, means for yieldably supporting said container on said die comprising a plurality of bores in one member, springs in said bores separating said members and guide means carried by said other member extending into the bores in said one member; means for heating the material to molding temperature comprising an induction coil about the container for heating the container and therethrough the material; a restricted passage in said container and a passage aligned therewith in said die for permitting the flow of material from the former to the latter; a single pressing plunger operable in one stroke to clamp the die together, to move the container against the die, to transfer the material into the die cavity, and to exert pressure on the material within the die cavity, the material pressing area of said plunger being greater than the projected area of said cavity for maintaining a clamping thrust on said die throughout a pressing cycle; and a shoulder on said plunger to engage said container and therethrough positively to hold said die clamped at the end of a working stroke of the plunger.

JOHN R. FISHER, JR.

REFERENCES CITED

The following references are of record in the file of this patent:

UNITED STATES PATENTS

| Number | Name | Date |
|---|---|---|
| 1,645,704 | Ledwinka | Oct. 18, 1927 |
| 1,916,495 | Shaw | July 4, 1933 |
| 1,919,534 | Shaw | July 25, 1933 |
| 1,997,074 | Novotny | Apr. 5, 1935 |
| 2,017,216 | Marcus | Oct. 15, 1935 |
| 2,226,448 | Smith | Dec. 24, 1940 |
| 2,274,279 | Shaw | Feb. 24, 1942 |
| 2,381,866 | Crosby | Aug. 14, 1945 |

FOREIGN PATENTS

| Number | Country | Date |
|---|---|---|
| 645,093 | France | Oct. 19, 1928 |
| 753,191 | France | Oct. 9, 1933 |